United States Patent

[11] 3,578,852

[72] Inventor Charles A. Aldridge
  Barrington, Ill.
[21] Appl. No. 735,861
[22] Filed June 10, 1968
[45] Patented May 18, 1971
[73] Assignee Bell & Howell Company
  Chicago, Ill.

[54] MOTION PICTURE APPARATUS HAVING SENSING MEANS FOR FILM CARRIED CUE SIGNALS
  4 Claims, 5 Drawing Figs.
[52] U.S. Cl. .................................................... 352/92,
  352/20, 352/236
[51] Int. Cl. .................................................... G03b 21/50
[50] Field of Search .......................................... 352/20, 22,
  23, 24, 31, 92, 236

[56] References Cited
  UNITED STATES PATENTS
  1,944,024 1/1934 Foster ........................... 352/92
  2,516,718 7/1950 Oriol ............................. 352/92X
  2,674,009 4/1954 Williams........................ 352/236X
  3,432,228 3/1969 Hellmund...................... 352/92X
  FOREIGN PATENTS
  711,478 7/1954 Great Britain................. 352/92

Primary Examiner—John M. Horan
Assistant Examiner—Monroe H. Hayes
Attorney—Raymond A. Andrew ABSTRACT: An apparatus for projecting motion picture films has a sensing station located adjacent the path of each margin of the film for sensing control marks on the film. The sensing stations may be selectively actuated to respond to markings on either of the marginal areas or to respond only to the simultaneous occurrence of markings on both marginal areas.

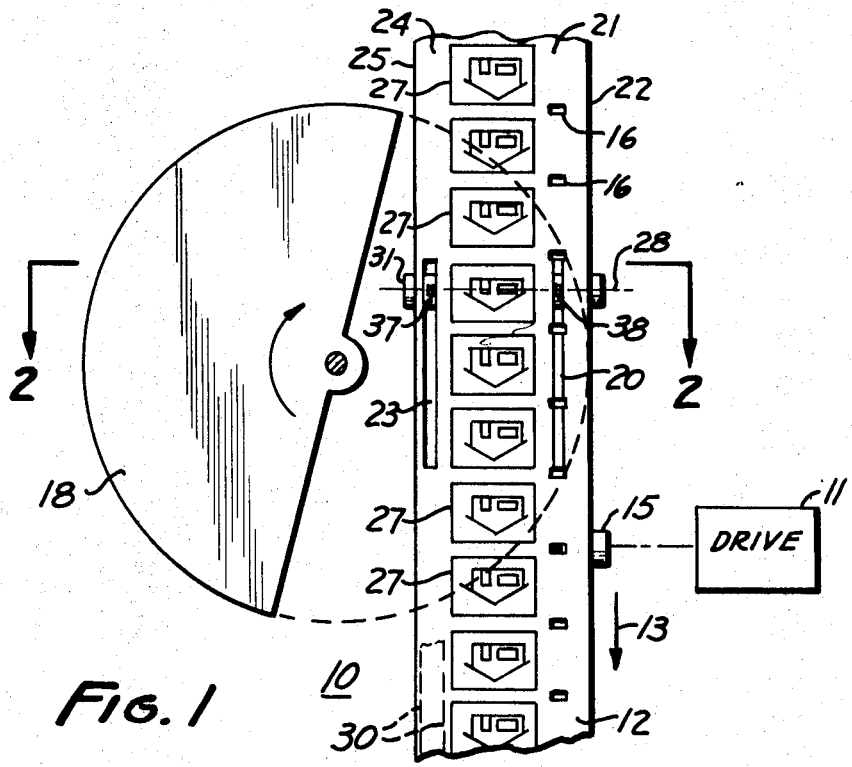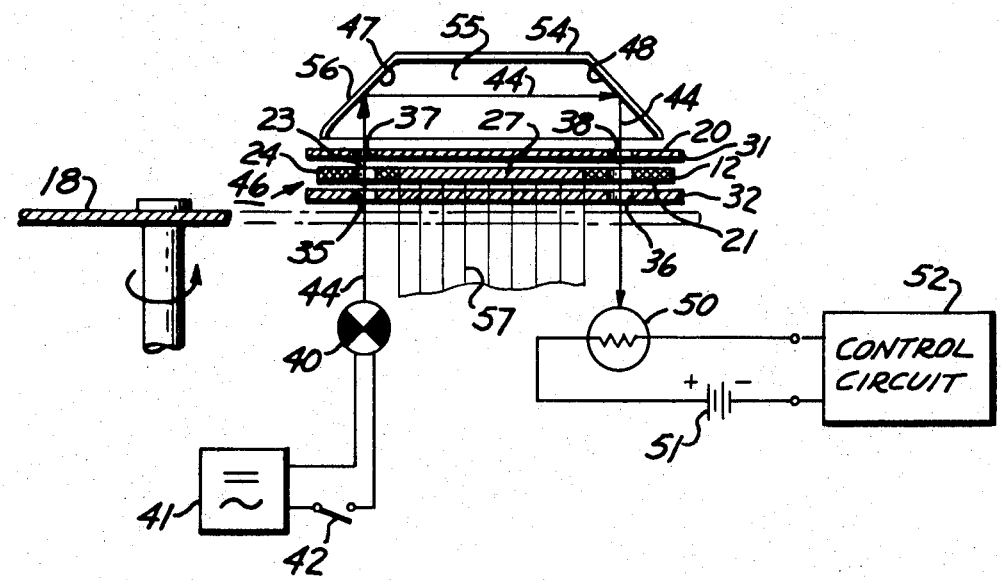

INVENTOR.
CHARLES A. ALDRIDGE

MOTION PICTURE APPARATUS HAVING SENSING MEANS FOR FILM CARRIED CUE SIGNALS

BACKGROUND OF THE INVENTION

1. Field of the Invention

The subject invention relates to elongate information carriers and, more particularly, to methods and apparatus for providing or sensing control markings on such carriers, and to elongate films comprising pictorial information and control markings.

2. Description of the Prior Art

The prior art will be discussed in connection with methods and means for controlling the playback of sound accompaniments for motion picture features, although it is not so limited, as those in the art will appreciate.

The desire to provide motion picture features with sound accompaniments is as old as the motion picture art itself. Since motion picture viewers are accustomed from their daily experience to perceive their environment both visually and aurally, it was soon recognized that the impression of live performances could only be approximated if motion picture performances were accompanied by relevant sound features.

During the first few decades of the developing motion picture art, sound reproduction machines separate from the motion picture projector were frequently employed for providing the desired sound accompaniments. To insure a sequence-correct control of the sound reproduction, the provision of appropriate control markings on the motion picture film has been proposed.

Control markings of this type which may take the form of slots, punches, notches, magnetic elements, electrically conductive areas, photographically exposed regions, and the like are, for instance, apparent from U.S. Pat. Nos. 1,049,171, 1,184,935, 1,523,173, 2,052,792, 2,282,957, 2,354,583, 2,475,439, 2,606,476, 2,551,349, 2,637.785, 2,673,485, 3,047,675, 3,049,965, 3,232,167 and 3,278,251, and British Pat. Specification No. 504,808, French Pat. No. 696,527, and German Pat. No. 826.409.

Highly advanced sound motion picture systems are means for providing control markings between sprocket holes of elongated information carriers, such as motion picture films.

In recent years, the use of separate sound recording media and equipment, as contrasted to a provision of optical or magnetic sound tracks on the motion picture film, has received renewed attention, since delicate equipment and techniques are required to provide sound tracks on the film itself. Also, the post-synchronization of motion pictures, wherein sound accompaniments are initially recorded on magnetic tape, is becoming more and more prevalent (see Gunst, A New System for Post-Synchronous Recording, Journal of the SMPTE, Vol. 69, Oct. 1960, pp. 720—22).

Despite advanced efforts in this area, a particularly cumbersome problem arises if sound control markings on a motion picture film are obliterated by faulty exposure, spurious notches or impressions and the like, or designations provided by the film manufacturer or processor in the control marking area. Since many of these blemishments are capable of causing an erroneous actuation of the sensing equipment employed for detecting the control marks, it follows that their presence easily leads to faulty sound reproductions which may spoil the entire performance.

This is particularly true if the control markings signify the respective commencements of sound accompaniment sequences which are to be reproduced in synchronism with corresponding motion picture sequences. In this situation, a single spurious marking can easily destroy the synchronism for all subsequent features.

SUMMARY OF THE INVENTION

The subject invention overcomes or materially alleviates problems of the above mentioned type and, from various aspects thereof, provides further improvements in the area under consideration. From one aspect thereof, the invention resides in a method of providing control markings on an elongate information carrier having two lateral edges, comprising the steps of providing a first control marking on said information carrier and in the vicinity of one of said lateral edges and providing a second control marking on said information carrier and in the vicinity of the other of said lateral edges, said second control marking being positioned relative to said first control marking so that a transverse line extending through said first control marking and substantially at right angles to said lateral edges intersects said second control marking.

It has been found in practice that blemishments on such media such as motion picture film which affect one of the control markings in most cases do not affect the other control marking which is located in spaced relationship to the one control marking. There are many reasons for this fact. For instance, it is frequently the custom of film manufacturers or processors to provide designations, such as their name or trademark, near one side of the two lateral edges of the film, so that control markings near the other film edge are not affected. Also, faulty exposures from defective containers which occur for instance during the shipping of an exposed film generally affect only a marginal region of the film so that control markings at the other marginal film region are not impaired. Moreover, an improper splicing of a leader to the film may affect one of the control markings, but not the other. This is, for instance, the case if one of the control markings is in a marginal film region occupied by sprocket holes and if the leader is spliced to the film in such a manner that sprocket holes on the leader coincide functionally with the one control marking in question during a display of the film.

From another aspect thereof, the invention resides in a method of providing control markings on a pictorial information-bearing film, such as a motion picture or strip film, for indicating commencements of sound accompaniments for pictorial information on the film, comprising the steps of providing for each sound accompaniment N mutually spaced start markings on the film, wherein N is an integer larger than one.

From yet another aspect thereof, the invention resides in apparatus for providing control markings on a motion picture film indicating commencements of sound accompaniments for motion picture features on the film, comprising means for providing for each sound accompaniment a pair of mutually spaced start markings on the film.

The invention resides also in apparatus for sensing control markings on a motion picture film on which first ones of the control markings are located in a first marginal region of the motion picture film and second ones of the control markings are located in a second marginal region of the motion picture film, comprising means sensitive during movement of the film to a substantially simultaneous occurrence at a sensing station of a first control marking and a second control marking for providing a control signal only upon such substantially simultaneous occurrence.

From a further aspect thereof, the invention resides in apparatus for sensing control markings on a motion picture film on which first ones of the control markings are located in a first marginal region of the motion picture film and second ones of the control markings are located in a second marginal region of the motion picture film, comprising means for sensing said first control markings and for alternatively sensing said second control markings.

The invention moreover resides in an elongate film comprising pictorial information to be displayed with selected sound accompaniments, and N control markings for each sound accompaniment for signifying the start thereof, wherein N is an integer larger than one.

The invention also resides in an elongate film comprising a first marginal region, a second marginal region, pictorial information between these first and second marginal regions, at least one first control marking in said first marginal region for signifying the start of a sound accompaniment for said pictorial information, and at least one second control marking in said second marginal region for signifying the start of said sound accompaniment.

BRIEF DESCRIPTION OF THE DRAWINGS

The invention and its various aspects will become more readily apparent from the following detailed description of preferred embodiments thereof, illustrated by way of example in the accompanying drawings, in which:

FIG. 1 is an elevation of essential parts of a motion picture projector in accordance with a first preferred embodiment of the subject invention;

FIG. 2 is a section along the line II–II in FIG. 1;

DESCRIPTION OF PREFERRED EMBODIMENTS

Figure 3:
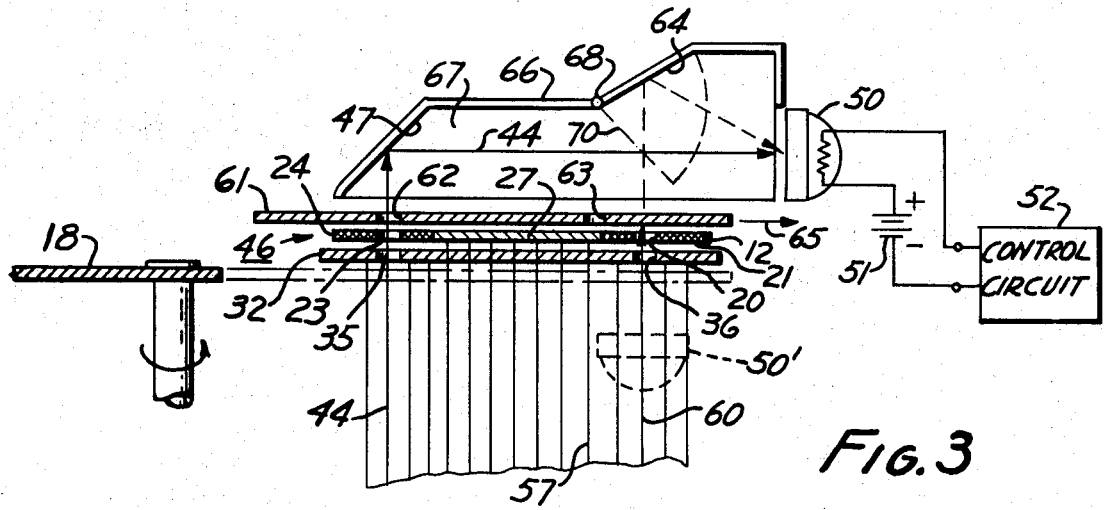
FIG. 3 is a sectional view of a first modification of the apparatus shown in FIG. 1.

The motion picture projector apparatus 10 of FIG. 1 includes drive means 11 for moving a film 12 in the direction of the arrow 13. In accordance with conventional practice, means 15, such as a pulldown mechanism or a sprocket drive, are provided for imparting an intermittent motion on the film 12.

The film is provided with sprocket holes 16 which permit the means 15 to engage the film during the intermittent advancement thereof.

The drive 11 also actuates a shutter 18 which has the purpose of interrupting the image display during the intermittent film movements. In FIG. 1, a rotary shutter of a semicircular configuration is shown, although it is understood that a different shutter type may be employed.

A first control marking 20 is located in a first marginal region 21 adjacent the lateral edge 22 of the film 12. A second control marking 23 is located in a second marginal region 24 adjacent the lateral film edge 25. A series of motion picture images 27 is located between the marginal film regions 21 and 24.

The positioning of the control marking 23 relative to the control marking 20 is such that a transverse line 28 which extends through the control marking 20 and substantially at right angles to the film edges 22 and 25 intersects also the control marking 23. As shown in FIG. 1, the control marking 20 extends between a series of sprocket holes 16 although it should be understood that a control marking 20 which extends between only two successive ones of the sprocket holes is useful in practice. The provision of a control marking 20 which extends over several sprocket holes is preferred in those cases in which a longer exposure of the equipment for sensing such control marking is desired, or in which a danger exists that the film processor will cut off the first one or two frames from the film during the development thereof or the application of a leader thereto. It should also be understood that the control marking 20 need not extend over the sprocket holes 16, but may be located between such sprocket holes and the lateral film edge 22. In practice, however, the positioning of the control marking 20 as shown in FIG. 1 is advantageous, since the space between the sprocket holes is generally useless for any other purpose and since film manufacturers and processors are more prone to provide designations, such as their name or trademark next to, rather than between, the sprocket holes. Similar considerations apply if a film is employed which has sprocket holes not only in its marginal region 21, but also in the marginal region 24 where the control marking 23 is provided.

In many instances, manufacturers provide some of their films with a marginal area adapted in size to the reception of a sound track. For instance, some manufacturers or processors provide motion picture film with a marginal coating including a magnetic recording material if a magnetic recording of sound accompaniments on the film is desired. A sufficiently wide area 30 for receiving a magnetic sound recording track is illustrated in FIG. 1 in dotted lines.

For present purposes, it is assumed that the control markings 20 and 23 are placed on the film 12 so as to signify the start of a sound accompaniment which has been recorded on a suitable medium, such as a magnetic tape (not shown) which is separate from the film 12. If the magnetic sound track is subsequently applied to the film and the sound accompaniments recorded thereon, the sound start markings 20 and 23 are no longer needed. Accordingly, the marking 23 is preferably located in the area which will be occupied by a subsequently applied magnetic sound track. In this manner, the start marking 23 does not occupy any space which could be useful for a recording of pictorial information. Considering this fact in conjunction with the above mentioned placement of the control marking 20 between the sprocket holes 16, it is seen that presence of the control markings 20 and 23 on the film 12 does not diminish the image areas thereof.

As is seen in FIG. 2, the film 12 is moved between a pair of plates 31 and 32. In accordance with standard practice, the plates 31 and 32 are provided with a picture window (not shown) or otherwise suitably designed so that light can pass through the film so as to display one image at a time on a projection screen (not shown).

The plate 32 has a pair of apertures 35 and 36, the mutual spacing of which corresponds substantially to the mutual spacing of the marginal film regions 21 and 24, or of the markings 20 and 23 to be more exact. The plate 31 has a pair of similar apertures 37 and 38. A lamp 40 is energized from a source 41 of direct or alternating current upon the closing of a switch 42 so as to emit a beam of light 44 through the aperture 35.

For present purposes, it is assumed that the margins 21 and 24 of the films are black, while the markings 20 and 23 are light-transparent. In practice, this may be accomplished by exposing the film 12 in its photosensitive state to light so as to provide the markings 20 and 23. If the film 12 is developed in a reversal process in which the positive images are provided on the same film on which they were photographed, the marginal film regions are exposed to light during the reversal process so that they experience upon development a strong darkening in all areas except those in which control markings 20 and 23 have been provided by previous light exposure.

The provision of black film margins is effected in a similar manner if the exposed film is developed to provide negative images and if positives of such negative images are printed on a second film. In this case, the film margins 21 and 24 are exposed to light during the negative-to-positive printing process.

Light from the source 40 which penetrates the aperture 35 cannot reach the aperture 37 when the black film margin is interposed between the apertures 35 and 37 during the movement of the film 12 through what may be considered a sensing station 46. On the other hand, once the sound start marking 23 has moved into the region between the apertures 35 and 37, the light beam 44 can proceed to a reflecting surface 47 and from there to a second reflecting surface 48, to be projected through the aperture 38. The twice-reflected beam 44 penetrates the film 12 at the transparent sound start marking 20 and proceeds thereupon through the aperture 36 to a photocell 50.

The photocell 50 is of a photoconductive type and conducts current from an electric current source 51 when struck by light. The electric signal thus provided may be applied to a control circuit 52 to initiate the execution of a control function. For instance, the control circuit 52 may serve as a means for starting movement of a tape recording for the reproduction of a sound accompaniment.

The presence of a spurious transparent marking in either one of the film margins 21 and 24 would not cause a faulty actuation of the control circuit 52, since the beam 44 has to pass through both marginal film regions before it can reach the photocell 50. It will be recognized in this connection that the sensing equipment illustrated in FIG. 2 operates in the manner of a logical AND element which provides only an output when both of two predetermined conditions, here the simultaneous presence of a marking 20 and a marking 23, are fulfilled. This being the case, it would also be possible to send separate light beams through the markings 20 and 23 and to employ separate photocells for sensing these beams, with the photocells being connected to an electrical AND element (not shown) for providing a control signal only upon excitation of all photocells.

If desired, the reflecting surfaces 47 and 48 may be provided by a mirror structure 54. Alternatively, a prism 55 may be employed for this purpose. The prism 55 may be provided with an outer coating 56 which may be light-reflecting or opaque so as to preclude an intrusion of spurious environmental light into the body of the prism 55.

It will be noted that the light beam 44 is obscured by the film margin 24 as long as the transparent marking 23 is not present between the apertures 35 and 37. Accordingly, the beam 44 is precluded in the absence of the marking 23 from reaching the photocell 50 through any of the sprocket holes 16. In practical terms, this means that no spurious sound start signals can be generated by the sprocket holes 16. If desired, the means and methods disclosed in the above mentioned Browder patent application may, however, be employed in conjunction with the sensing means and methods disclosed herein.

If the provision of a separate lamp 40 at the sensing station 46 is not desired, light from the beam of light 57 employed for illuminating the pictures 27 may be applied to the aperture 35 so as to provide the above mentioned beam of light 44 through the sensing station.

A modification of the apparatus illustrated in FIGS. 1 and 2 is illustrated in FIG. 3, according to which light from the beams 57 employed for image projection purposes is applied to the apertures 35 and 36 so as to provide thereat the above mentioned beam 44 and a further beam 60, respectively. If desired, one or more separate lamps (not shown) may be employed for providing the beams 44 and 60. A slidable plate 61 has a first aperture 62 which may be brought into registry with the aperture 35 when the plate 61 is in its illustrated position. The plate 61 has a further aperture 63 which may be brought into registry with the aperture 36 by a movement of the plate 61 in the direction of the arrow 65. If the plate is in its illustrated position, the beam 44 can reach the reflecting surface 47 through the transparent control marking 23. The surface 47 reflects this beam so that it reaches the photocell 50 for the initiation of a control function of the above mentioned type.

If the film margin 24 should be found to be contaminated by spurious transparent areas, the plate 61 is shifted in the direction of the arrow 65 so that the beam of light 44 is interrupted and the exposure of the photocell takes place when the beam 60 penetrates a transparent control marking 20 and the shifted aperture 63 now in registry with the aperture 36. A reflecting surface 64 is provided to deflect the beam 60 to the photocell 50.

As mentioned above, the statistical probability that spurious markings affect both film margins is much lower than the probability that only one of the margins is affected thereby. There are many reasons for this fact. For instance, film manufacturers or processors will generally limit themselves to applying their name or trademark to one of the margins. Also, unintended exposures of photosensitive films, such as during a shipping thereof, are extremely rare and, if they occur, are generally due to a defective cartridge which admits light so as to expose marginal areas of a number of film turns. Central film regions are generally protected from spurious exposure by the first or second outer turns of the roll of film, and the statistical probability that a cartridge is that defective so as to admit light to film margins at both sides of the film is extremely small.

Accordingly, the sliding plate 61 in FIG. 3 constitutes a convenient means for selecting the better one of the two film margins 21 and 24 for a sensing of the control markings. If the film margin 24 should be provided with a magnetic recording sound track as mentioned above, then the plate 61 may be shifted so that the marking 20 is sensed. In this manner, sound recorded on tape may be transferred to the film sound track in a synchronous fashion, or sound film may be played back with a projector having no sound equipment, with sound accompaniments being provided by separate sound reproduction equipment, such as a tape recorder, controlled by marks in the film margin 21.

The reflecting surfaces 47 and 64 may be provided by a mirror structure 66 which provides mirror surfaces at 47 and 64. Alternatively, a prism 67 may be employed for providing the reflecting surfaces 47 and 64.

If desired, the reflecting surface 64 may be provided by a mirror which is hinged at 68 so that it may be swung into position shown in dotted lines at 70. The photocell 50 may thereupon be located in the position illustrated in FIG. 3 in dotted lines at 50'. It will be recognized that the beam 44 is reflected at 70 in the direction of the control marking 20. Accordingly, if the plate 61 in FIG. 3 is replaced by the plate 31 having the apertures 37 and 38 shown in FIG. 2, the sensing apparatus of FIG. 3 may be adapted in the manner just described so that its mode of operation will be the same as that described above in connection with FIG. 2.

Sensing equipment illustrated in FIG. 3 thus has three modes of operation. In one of these modes, the control marking 23 is sensed. In a second mode of operation, which is initiated by bringing the aperture 63 into registry with the aperture 36, the control marking 20 is sensed. In a third mode of operation, the beam 44 is reflected at 70 in the direction of the photocell positioned at the dotted lines 50', so that both of the control markings 20 and 23 have to be simultaneously present at the sensing station 46 before a control signal will be produced by the photocell 50.

Figure 4:
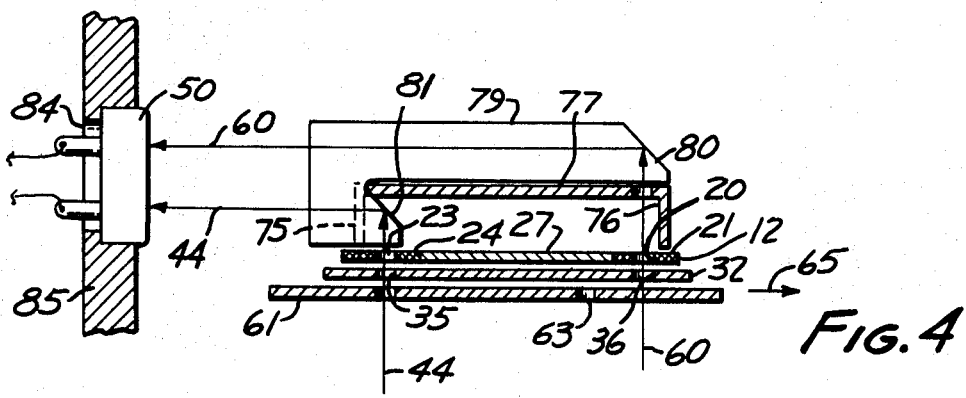
FIG. 4 is a sectional view of a second modification of the apparatus of FIG. 1.

A modification of the sensing system illustrated in FIG. 3 is shown in FIG. 4.

According to FIG. 4, the film 12 moves along two legs 75 and 76 of a pressure shoe 77, while the above mentioned plate 32 may serve as a film pressure plate. A prism 79 defines a surface 80 for deflecting the beam 60 and somewhat straddles the leg 75 so as to define a surface 81 for deflecting the beam 44. The beam 60 is blocked so that the control marking 23 is sensed when the slidable plate 61 is in its illustrated position. On the other hand, after the plate 61 has been moved in the direction of the arrow 65 so that its aperture 63 is in registry with the aperture 36, the beam 44 is blocked and the control marking 20 is sensed by means of the beam 60.

The photocell 50 is conveniently mounted in a counter-bored aperture 84 of an upright mounting plate 85 of a type generally present in motion picture projectors for the mounting of various parts of the drive mechanism.

If desired, the beam selector plate 61 may be replaced by functionally equivalent means at the left-hand side of the prism 79 for alternatively blocking the beam 60 or the beam 44 at that location.

Figure 5:
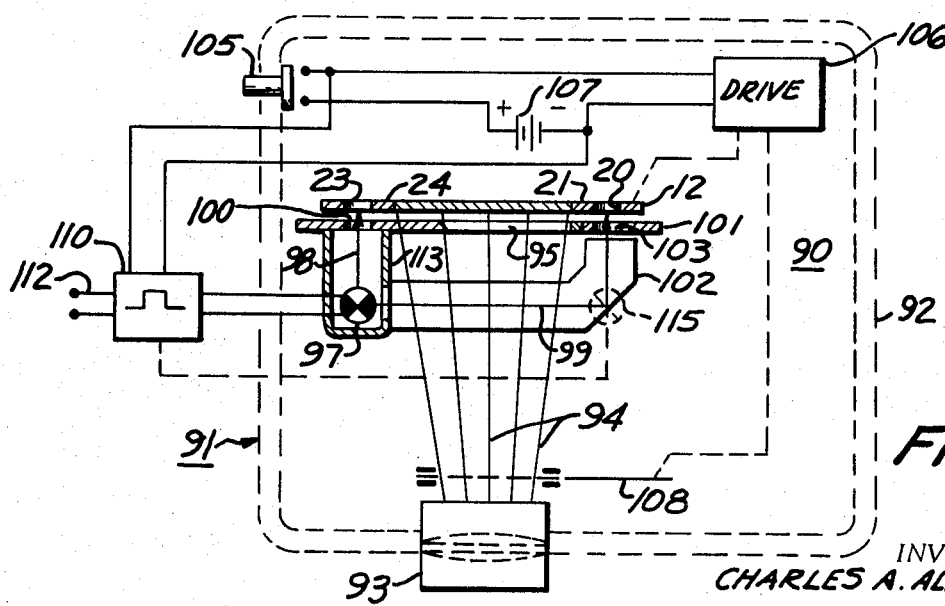
FIG. 5 is a section through essential parts of a motion picture camera embodying features of the subject invention.

An apparatus 90 for providing the above mentioned control markings 20 and 23 in the margins 21 and 24 of the film 12 is illustrated in FIG. 5. This apparatus includes a motion picture camera 91, only the more relevant parts of which are illustrated.

The camera 91 includes a housing 92, and also a lens system 93 for projecting images 94 of objects being photographed through an image window 95 onto the film 12. The camera 91 further includes a lamp 97 for generating two light beams 98 and 99. The beam 98 is projected onto the film margin 24 through an aperture 100 in a plate 101, while the beam 99 is guided by suitable means such as a prism 102 to an aperture 103. The beam 99 proceeds through this aperture to impinge on the film margin 21.

In the illustrated embodiment, the lamp 97 is energized as follows:

If a camera release button 105 is depressed, a camera drive 106 is energized from a battery 107. The drive intermittently advances the film 12 and also actuates a shutter 108 in a conventional manner. When the button 105 is depressed or a similar manually or automatically actuated switch closed, current is supplied from the battery 107 to a control circuit 110 which provides an energizing pulse for the lamp 97 so as to cause such lamp to emit light for a brief period of time. This causes the beams 98 and 99 to expose the film margins 21 and 24 so as to provide the control markings 20 and 23. The length of these markings may be determined by the length of the lamp energizing pulse provided by the control circuit 110. This control circuit may also provide a pulse at output terminals 112 thereof for initiating the starting of a sound recording apparatus, such as a tape recorder, for a simultaneous recording of sound impressions accompanying the scene being filmed. Alternatively, a suitable sound accompaniment may be provided at a later time, such as during an editing of the developed film by the author.

The circuits for energizing the lamp 97 and starting a tape recorder may, for example, be the same as those disclosed in the above mentioned Lancor patent application. Also, the sound start markings 20 and 23 may be provided after some delay from the start of the particular motion picture sequence, as taught in the above mentioned Lancor application.

If desired, the lateral opening in the lamp housing 113 may be closed and the prism 102 removed. In this case, a second lamp housing and a second lamp illustrated in FIG. 5 in dotted lines at 115 and energized from the control circuit 110 is employed for providing the control marking 20, while the lamp 97 provides the control marking 23. Since the camera housing 92 provides a confined environment, it is also possible to provide for an exposure of the film margins 21 and 24 by the lamp 97 without the use of a lamp housing 113 and prism 102.

Various alternative methods for providing the control markings 20 and 23 on the film 12 are available. For instance, these markings may be provided during an editing of the film in the black film margins 21 and 24 by suitable equipment, such as a small scraper or moistened swab by means of which appropriate portions of the black emulsion on the film margins are removed.

While only one pair of control markings has been shown herein, it should be understood that several such pairs may be provided on a motion picture film. For instance, if a film contains various motion picture sequences which are to be provided with different sound accompaniments, a pair of control markings 20 and 23 may be provided for each sound accompaniment to signify the commencement thereof. To improve the attainable signal-to-noise ratio, three or more simultaneously sensed control markings may be provided on the film in lieu of the pairs just mentioned.

Also, it is not absolutely necessary that the control markings 20 and 23 be transparent. For instance, either one or both of these markings could be opaque. In this case, the film margins 21 and 24 would be transparent. Alternatively, magnetized elements could be applied to the film margins to provide markings readable by magnetic head equipment. The control markings may, in accordance with a further alternative solution, be formed by electrically conductive elements which are either sensed as current-conductive paths or as capacitor electrodes affecting the tuning of a tuned mark sensor circuit.

In general, however, transparent mark markings on a dark background have been found most advantageous in terms of their production by selective film exposure, as well as in terms of their sensing by photocell sensing equipment.

From a different point of view, it should also be understood that the photocells shown herein may be ultraviolet or infrared detectors, with ultraviolet or infrared radiations being provided in the beams 44 and 60.

Even though the provision of sound start markings has been somewhat emphasized herein as a possible application, it should be understood that control markings of the type of the marking pairs 20 and 23 may be provided on the film for purposes other than that of initiating a reproduction of sound accompaniments.

While specific embodiments have been described and illustrated herein, various modifications within the spirit and scope of the subject invention will become apparent or suggest themselves to those skilled in the art.

I claim:
1. In apparatus for sensing transparent control markings on a motion picture film on which first ones of said control markings are located in a first marginal region of said motion picture film, and second ones of said control markings are located in a second marginal region of said motion picture film spaced from said first marginal region:
   a. means defining a sensing station and including:
      1. means for producing an electric signal in response to light; and
      2. means for sending a beam of light through a first portion of said sensing station and thereupon to said light-responsive means through a second portion of said sensing station, with the spacing between said first and second portions corresponding substantially to the spacing between said first and second marginal film regions; and
   b. means for moving said film through said sensing station so that said first marginal film region moves through said first portion of the sensing station and said second marginal film region moves through said second portion of said sensing station, whereby said beam of light is interrupted unless a said transparent first control marking and a said transparent second control marking are simultaneously present in said sensing station.

2. An apparatus for sensing transparent control markings on a motion picture film having first transparent control markings located in a first marginal region of said motion picture film, and second transparent control markings located on a second marginal region of said motion picture film spaced from said first marginal region comprising:
   1. means for producing an electric signal in response to light;
   2. first and second sensing stations;
   3. means for projecting light through said first sensing station and thereupon to said light responsive means, and for projecting light through said second sensing station and thereupon to said light-responsive means; and
   4. selectively actuable means for alternatively blocking the flow of light through said first station only or the flow of light through said second station only; and
   5. means for moving said film through said first and second sensing stations so that said first marginal film region moves through said first sensing station and said second marginal film region moves through said second sensing station, whereby said signal-producing means responds to light passed by said transparent second control markings when said alternative blocking means have been actuated to block a flow of said light through said first sensing station, and whereby said signal-producing means responds to light passed by said transparent first control markings when said alternate blocking means have been actuated to block a flow of said light through said second sensing station.

3. An apparatus for sensing control markings on a motion picture film having first control markings located on a first marginal region of said motion picture film, and second control markings located on a second marginal region of said motion picture film comprising:
   a. means defining a sensing station; said sensing station including sensing means for detecting the presence of a control marking on said film;
   b. means selectively actuable from a first mode of operation to a second mode of operation rendering said sensing means operative for sensing in said first mode of operation only the substantially simultaneous occurrence of the first control markings and the second control marking at said sensing station, and sensing in said second mode of operation the individual occurrence of the first control markings at said sensing station; and
   c. means for moving said film through said sensing stations.

4. The apparatus of claim 3 further including means for actuating said sensing means to a third mode of operation for sensing only the individual occurrence of the second control marking at said sensing station.